United States Patent
Hobein et al.

(10) Patent No.: US 9,677,696 B2
(45) Date of Patent: Jun. 13, 2017

(54) FLUID-CONDUCTING CONNECTION WITH CLAMPING RING

(71) Applicant: FORD GLOBAL TECHNOLOGIES, LLC, Dearborn, MI (US)

(72) Inventors: Bert Hobein, Aachen (DE); Michael J. Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 14/830,916

(22) Filed: Aug. 20, 2015

(65) Prior Publication Data
US 2016/0061363 A1 Mar. 3, 2016

(30) Foreign Application Priority Data

Sep. 1, 2014 (DE) ........................ 10 2014 217 410

(51) Int. Cl.
| | | |
|---|---|---|
| *F16L 17/00* | (2006.01) | |
| *F16L 19/07* | (2006.01) | |
| *F16L 19/065* | (2006.01) | |

(52) U.S. Cl.
CPC ............. *F16L 19/07* (2013.01); *F16L 19/065* (2013.01)

(58) Field of Classification Search
USPC .................... 285/89, 92, 348, 353, 374, 382
See application file for complete search history.

(56) References Cited

U.S. PATENT DOCUMENTS

| | | | | | |
|---|---|---|---|---|---|
| 2,284,216 | A | * | 5/1942 | Kunkel | ............... F16L 19/0225 285/331 |
| 2,457,633 | A | * | 12/1948 | Borg | ..................... F16L 19/041 285/331 |
| 3,348,570 | A | * | 10/1967 | Nealy | ................. F16K 27/0254 137/315.36 |
| 4,560,232 | A | * | 12/1985 | O'Hara | .................... B01J 3/002 220/288 |
| 4,865,363 | A | * | 9/1989 | Takahashi | ............ F16L 19/065 285/323 |
| 4,932,472 | A | * | 6/1990 | Boehm, Jr. | ............. E21B 33/04 166/182 |
| 4,960,172 | A | * | 10/1990 | Nelson | .................. E21B 33/043 166/208 |

(Continued)

FOREIGN PATENT DOCUMENTS

| | | |
|---|---|---|
| EP | 1067323 A1 | 1/2001 |
| JP | 2009250408 A | 10/2009 |
| WO | 2008104562 A1 | 9/2008 |

*Primary Examiner* — Aaron Dunwoody
(74) *Attorney, Agent, or Firm* — Greg Brown; Brooks Kushman, P.C.

(57) ABSTRACT

A connection for conducting pressurized fluids between a tube and a connection component having a bore for receiving the tube. A clamping ring surrounds the tube and is seated on a seat between first and second bore segments and has an annular lip extending away from the seat. A locking bolt having a through-hole receiving the tube is threaded into the first bore segment and contacts the ring, an annular collar projecting from the locking bolt surrounding the lip and urging it radially inward to grip the tube when the bolt is tightened against the clamping ring. A sealing ring surrounding the tube is positioned between the clamping ring and a sealing ring seat defined between the second and third bore segments.

15 Claims, 6 Drawing Sheets

(56) References Cited

U.S. PATENT DOCUMENTS

| | | | |
|---|---|---|---|
| 5,299,644 A * | 4/1994 | Eckert | E21B 33/03 166/379 |
| 5,456,314 A * | 10/1995 | Boehm, Jr. | E21B 33/04 166/208 |
| 5,681,058 A * | 10/1997 | Hwang | F16L 19/048 285/133.4 |
| 6,123,364 A | 9/2000 | Inoue et al. | |
| 6,568,718 B1 | 5/2003 | Allegri | |
| 6,851,729 B2 | 2/2005 | Gibson | |
| 2003/0107216 A1 | 6/2003 | Gibson | |
| 2006/0012169 A1 | 1/2006 | Williams | |
| 2007/0252384 A1 * | 11/2007 | Dickerson | F16L 41/10 285/89 |

* cited by examiner

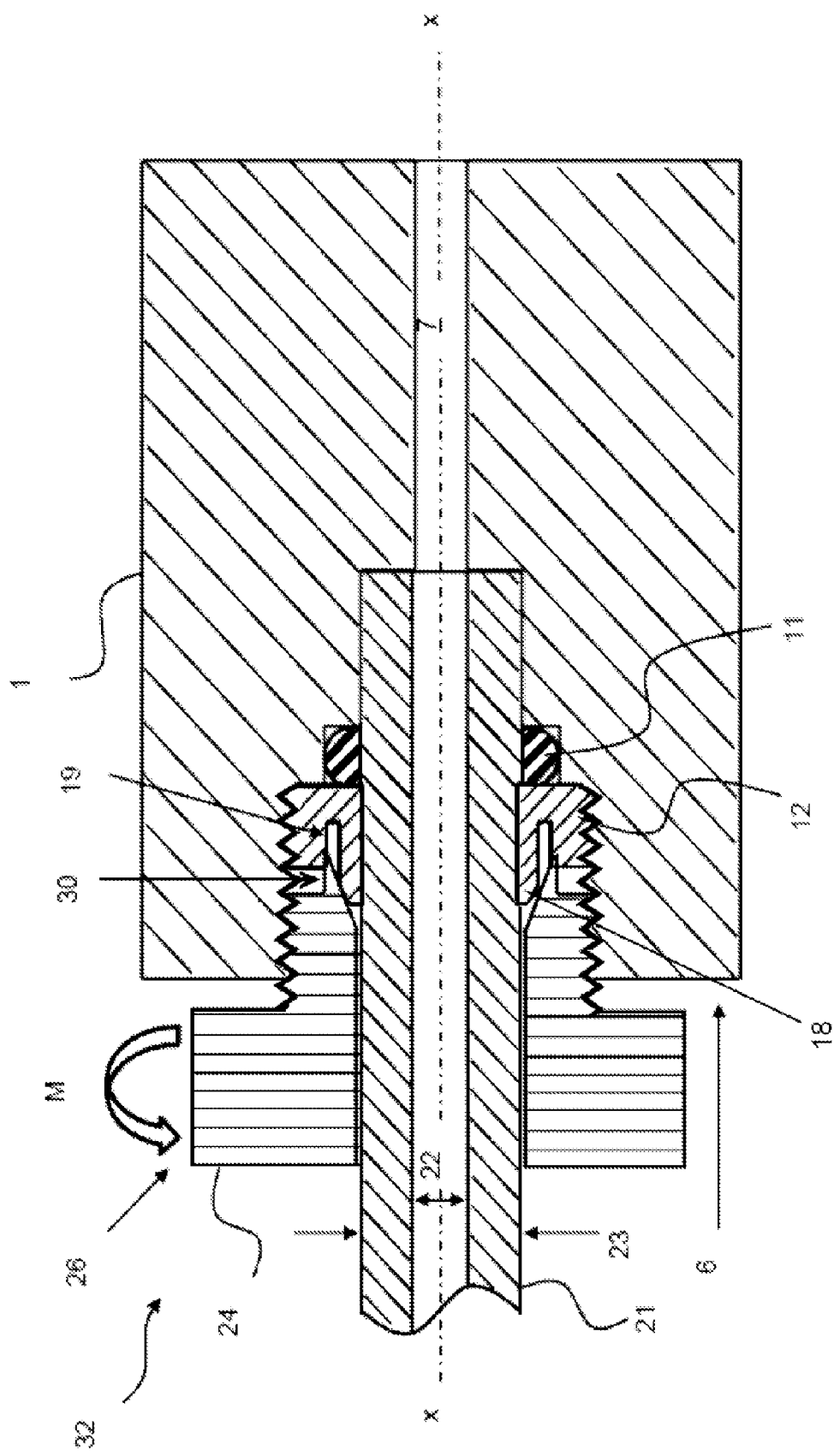

FLUID-CONDUCTING CONNECTION WITH CLAMPING RING

CROSS-REFERENCE TO RELATED APPLICATIONS

This application claims foreign priority benefits under 35 U.S.C. §119(a)-(d) to DE 10 2014 217 410.4 filed Sep. 1, 2014, which is hereby incorporated by reference in its entirety.

TECHNICAL FIELD

The present invention relates to a fluid-conducting connection between a tube and a connection component.

BACKGROUND

Fluid-conducting connections serve to connect pneumatic and/or hydraulic systems that are pressurized. The fluids to be conducted may be, for example, gases and/or liquids. Such connections are arranged in the field of fitting technology, which distinguishes substantially between non-releasable press-fit connections and releasable plug type connections. The present invention is directed toward releasable connections which may be easily disconnected and reconnected.

The decision to use a particular type of fitting within the releasable connection types for a specific industrial application may be made, for example, on the basis of the pressure and/or temperature ranges anticipated. The type of the fluid to be conducted is also significant in order to be able to ensure leak-free operation. Though some prior art fittings manage with a sealing action produced purely by metal, in the case of high-pressure systems (more than 70 MPa, for example) may require additional sealing means.

Depending on the application, it is advantageous to carry out the construction of such a connection with a "smooth" tube. This means that the end of the tube that makes the connection has a uniform outer diameter. In this instance, the term "smooth" tube or a tube having a "uniform outer diameter" is intended to mean one which has consistent, cylindrical outer surface over at least the portion thereof which is to be used in making the connection. Accordingly, the outer surface of the tube does not comprise any projections and/or protrusions required for making the connection, such as, for example, a flange, a collar, a swage, or a flare. It is also necessary to distinguish therefrom, for example, extents which taper and/or are conical. In other words, such a smooth tube having a uniform outer diameter means the free or distal end portion thereof is a typical straight tube.

Generally, the plug-type connections previously known in conjunction with a sealing ring for forming a fluid-conducting connection having a tube which has a uniform outer diameter also does not afford any possibility for the direct connection thereof to a connection component in the form of a system component such as, for example, a tank or a filter. This is substantially a result of the configurations of such system components which primarily provide for the connection piece as an intermediate coupling. Consequently, such configurations require a screw member which may be in the form of a nut having an inner or female thread and which engages a male thread formed around an outer circumferential surface of the connection component.

SUMMARY

The disclosed apparatus provides a connection between a tube which has a smooth or a uniform outer diameter and a connection component which is in the form of a system component so that the connection has an improved sealing action using a clamping ring and also allows multiple separations and repeated connection in a simple and reliable manner with the clamping ring thereof being retained.

Accordingly, the connection component comprises a bore formed therein and in which the tube can be inserted at least partially. In this instance, an opening inside the connection component is considered to be a bore and is suitable for at least partially receiving the tube and for conducting a fluid from the tube into the connection component and/or vice versa. The bore can preferably merge into a line which is connected to the bore so as to conduct fluid. Accordingly, the fluid to be conducted can be conducted by means of the combination of the line and bore through the connection component or further conducted therein.

The bore further has an inner (female) thread which is at least partially formed therein. In contrast, the locking bolt has an outer (male) thread which can be brought into engagement with the inner thread and which is arranged at least partially thereon. The locking bolt is constructed in such a manner that it can be arranged around the tube. To this end, the locking bolt may have a suitable through-hole for receiving the tube therethrough.

In a disclosed manner, the inner thread of the bore may extend as far as a front surface of the connection component or begin at that location. In a further disclosed manner, the outer thread may begin at or extend as far as a tip of the locking bolt, which tip is provided for insertion into the bore. In this manner, the threads located on the locking bolt and bore engage with each other directly when the locking bolt is inserted into the bore and rotated relative to the connection component. There is thereby produced a connection which is formed directly at the beginning of the insertion of the locking bolt into the bore and which allows simple and precise handling.

There is further provided a clamping ring which is adapted to receive the tube. In this manner, the clamping ring and the locking bolt can be fitted and/or pushed together over the tube, the clamping ring being arranged upstream of the locking bolt in relation to the insertion direction of the tube into the bore. The locking bolt and clamping ring correspond in such a manner that the clamping ring can be clamped to the tube by the locking bolt being screwed into the connection component.

The term "clamping" is intended to be understood to be a plastic or elastic deformation of at least some part or region of the clamping ring radially inward around the outer surface of the tube. A clamping action results from the locking bolt being screwed into the connection component and is used to mechanically secure the tube inside the connection component. Since the clamping ring is fixed by the locking bolt inside the connection component, the tube is retained in the connected position by the clamping ring which is clamped with respect thereto. In this manner, a non-permanent locking connection is established between the tube and the connection component.

There is also provided a sealing ring which can be arranged together with the clamping ring and the locking bolt inside the bore of the connection component. It is used therein to seal around the outer peripheral surface of the tube with respect to the bore of the connection component. In other words, the sealing ring is also fitted and/or pushed onto the tube, with the sequence being initially the locking bolt, followed by the clamping ring and finally the sealing ring. The sealing ring may be a resilient sealing means, for example, an O-ring made of an appropriate material.

The clamping ring disclosed herein has an outer or male thread which—similarly to the outer thread of the locking bolt—can engage the inner thread of the bore. In this embodiment, the clamping ring is constructed in order to fix the sealing ring in a longitudinal axial direction of the bore inside the connection component when the clamping ring is screwed into the bore.

The clamping ring further has an annular clamping lip projecting along the axis of the clamping ring and the bore. The lip may extend around the entire circumference of the clamping ring. It is alternatively possible for the clamping lip to comprise individual segments arranged on the clamping ring in the form of individual tongues, which extend in the axial direction of the bore. That is, the term "annular" is to be construed to include a geometry that includes one or more gaps or slots located around the circumference of the clamping lip and separating adjacent tongues. The clamping lip projects from the end surface of the clamping ring which faces toward the locking bolt in the fitted state. Accordingly, the clamping lip is arranged on a front surface of the clamping ring, which surface faces away from the seat on which the clamping ring is positioned when the in the screwed-in state within the bore, and therefore also away from the sealing ring.

As a result of this construction, the clamping lip necessarily comes into contact with the locking bolt so that the approach thereof toward the clamping ring can be converted into an increasing radial clamping force around the tube. To this end, the clamping lip is urged radially inward toward the outer surface of the tube, so that a clamping contact is produced. The lip is formed so as to be thinner and consequently more flexible than the remaining base of the clamping ring, whereby the resilient deformation thereof becomes possible.

The clamping lip may be surrounded by an annular groove formed in the base of the clamping ring. In this case, the annular groove is formed in an end surface of the clamping ring base facing away from the sealing ring and seat, thereby increasing the length of the clamping lip. In other words, the annular groove is provides an increase in deformability of the clamping lip with respect to the remaining base portion of the clamping ring. As a result of the annular groove, no equivalent increase of the length of the clamping lip in a longitudinal axial direction of the bore is required so that the clamping ring can be constructed so as to be more compact.

The desired deformability of the clamping lip when inserted into the bore can be adjusted by altering the depth of the annular groove. This may also be achieved, for example, by selection of the material used for the clamping ring. The ring may preferably be formed from an individual material, in particular a metal material, the clamping lip particularly preferably being able to be a materially integral component of the remaining base portion of the clamping ring. However, it is also conceivable to connect the clamping lip to the clamping ring subsequently.

The locking bolt disclosed herein has an annular collar at the tip thereof which is first inserted into the bore. The collar projects in such a manner that it corresponds to the clamping lip of the clamping ring which is inserted into the bore prior to or ahead of the locking bolt. Accordingly, when the locking bolt is screwed into the connection component the collar of the locking bolt is urged into contact with the clamping lip of the clamping ring in such a manner to urge the clamping lip radially inward into clamping contact around the tube as described above. The clamping lip is surrounded by the collar from the outer side so that a radially inwardly directed loading is produced on the clamping lip. The radial loading of the clamping lip by the collar, and therefore the clamping action on the tube, therefore depend on the torque applied to the locking bolt when it is tightened into the bore and into contact with the clamping ring.

To this end, the clamping lip may have an exterior chamfered surface formed around the free or distal end thereof. The clamping lip chamfer tapers to a smaller diameter in the direction of the locking bolt in such a manner that the locking bolt contacts the angled surface of the chamfer with increasing screw-in depth into the connection component. It is thereby possible to adjust a selected clamping force in accordance with the torque applied. The collar of the locking bolt may have an internal chamfer which corresponds to the external chamfer of the clamping lip.

As a result of the opposing gradients or angles of the external chamfer of the clamping lip and the internal chamfer of the collar, they slide further onto each other with an increasing torque on the locking bolt, whereby the radial loading on the clamping lip and therefore the clamping action on the tube can be adjusted. To this end, the clamping lip may be constructed so as to be more flexible than the collar. Naturally, it is also possible to adjust the flexibility by means of an appropriate use of materials for the collar and the clamping lip. The collar may be a materially integral component of the locking bolt. Naturally, it is also conceivable to subsequently connect the locking bolt and the collar.

The collar of the locking bolt is configured to extend at least partially into the groove formed in the clamping ring when the locking bolt is in the screwed-in state within the connection component bore. In other words, the collar can be inserted into the annular groove of the clamping ring with increasing screw-in depth of the locking bolt in the connection component and an associated increase in the clamping action.

Among the advantages resulting from the invention are that it provides a combination of a connection which retains by means of clamping and which seals by means of an additional sealing ring. Accordingly, the clamping action is dependent on the tightening torque on the locking bolt and therefore on the application of force to the clamping ring, whereas the sealing provided by the sealing ring is independent of the tightening torque.

In other words, when the clamping ring is screwed into the bore of the connection component a defined position for the sealing ring inside the connection component is provided, in which position the sealing ring is protected by the clamping ring. Since the clamping ring cannot move further into the bore than the clamping ring seat, any tightening torque applied to the locking bolt acts only on the clamping action of the clamping ring, with no undesired displacement of or damage to the sealing ring resulting from tightening of the locking bolt.

Accordingly, the advantages of a sealing means, in particular a resilient sealing ring, can also be used in a high-pressure connection which requires a correspondingly great force to fix the tube inside the connection component by means of the clamping ring. Such connections are typical, for example, in high-pressure fluid systems in vehicles. The invention further allows simple disconnection and reconnection of such a connection. This occurs in an extremely practical manner because that operation is reduced simply to the locking bolt being screwed in and unscrewed. Any complex manual operations with regard to the otherwise freely movable clamping ring and/or sealing ring are completely dispensed with because they remain together inside the connection component. Possible damage to the clamping ring and/or the sealing ring is thereby minimized. Possible plastic deformations of the clamping ring, which might otherwise reduce or even prevent the sealing action of the clamping ring, do not have any disadvantageous effects in that the sealing action can result simply from the sealing ring.

The clamping ring may also provide a metal-to-metal sealing function which advantageously supplements the sealing action provided by the sealing ring. Should the sealing action of the sealing ring be considered to be no longer adequate, the ring can readily be removed and replaced after the clamping ring has been unscrewed from the connection component. Where applicable, the clamping ring can then also be replaced.

The fluid-conducting connection disclosed herein allows a direct connection between a tube and a connection component, for example, in the form of a system component. Conventional arrangements which provide for the arrangement of a fitting on a tube in the form of an intermediate piece require additional components and connections in order to construct the connection. They are further suitable for high-pressure systems only in a limited manner. In particular, the present invention avoids otherwise necessary intermediate steps, such as, for example, the preparation of a tube which is intended to be connected by means of processing, formation and/or welding with necessary additional components.

According to one feature of the invention, the bore of the connection component can be subdivided into individual segments having different inner diameters. Thus, the bore may have a first segment and a second segment, of which the first segment is located adjoining a front surface of the connection component and extends from that front surface as far as the second segment. The front surface of the connection component is the surface which from which the tube is inserted into the connection component. In other words, the tube first passes through the first segment of the bore when it is introduced into the connection component before it reaches the second segment. In this instance, the first segment has a larger inner diameter when compared to the second segment.

The change in diameter between the two segments of the bore preferably occurs in a plane normal to the bore axis to thereby form a clamping ring seat. The clamping ring seat provides an annular abutment face for the clamping ring when it is screwed fully into the bore. In this regard, the clamping ring seat forms a structural limit for the installation depth of the clamping ring within the connection component so that the ring contacts the clamping ring seat during the screwing-in action.

The clamping ring thus achieves a previously defined depth position within the connection component, and that depth position cannot be further changed by the locking bolt being tightened. A high torque can therefore be applied to the locking bolt if necessasry to obtain the necessary clamping action around the tube by the clamping ring. Since the depth position of the clamping ring can no longer be changed, the sealing ring remains reliably protected from any negative influences resulting from tightening of the locking bolt such as, for example, compression owing to undesirable displacement of the clamping ring. As a result, it is possible to use a resilient sealing ring.

The bore may further comprise a third segment which adjoins the second bore and has a third diameter smaller than that of the second segment. The change of the inner diameter may occur in a plane normal to the bore axis so as to form a second seat adapted to receive the sealing ring.

Accordingly, the sealing ring seat provides a structural limit to the axial depth position of the sealing ring within the bore. In addition to the sealing action which can be optimized in this manner, the sealing ring is protected from any axial displacements further into the connection component, which may sometimes result in undesirable deformations of or even damage to the sealing ring. In any case, a structural abutment surface or seat is provided for the sealing ring, against which seat the ring can advantageously be supported in particular in the case of a subsequent or repeated removal from and re-insertion of the tube into the bore.

The clamping ring seat and the sealing ring seat are spaced from one another along the bore axis to provide sufficient space for the sealing ring. The clamping ring can be screwed into the bore until it abuts the clamping ring seat and the space required for the sealing ring is reliably provided inside the connection component.

As a result of the above-described construction, a peripheral groove is provided for the sealing ring after the clamping ring has been screwed in, within which groove the sealing ring may achieve a sealing action independently of any torques applied to the locking bolt. It is possible for the clamping ring to have different configurations of its annular surface which faces the sealing ring seat, whereby the spacing between the sealing ring seat and the said annular surface is changed. It is thereby possible to carry out any adaptations to different dimensions of the sealing ring, such as, for example, the cord thickness thereof, in order to obtain ideal conditions for the sealing action thereof. It is also possible to change the length of the second segment of the bore within the connection component with the same result.

The fluid-conducting connection disclosed herein allows an improved sealing action in spite of the use of a clamping ring, in particular in the case of high-pressure connections. This is based on the advantageous combination of a mechanical clamping of the coupling which is in the form of a plug type connection and the additional sealing means in the form of the sealing ring. As a result of that combination, repeated disconnection and reconnection is also possible in an extremely simple and reliable manner which can be carried out with the same clamping ring being retained.

Particularly the protected and precisely positioned arrangement of the sealing ring within the connection component effectively protects the ring from possible damage or being lost during disconnection and reconnection. Generally, the disclosed connection is extremely user-friendly because the components necessary for the clamping and/or sealing in the form of the clamping ring and the sealing ring all remain in a secure, yet also removable, manner inside the connection component. Furthermore, it is also possible to apply a high tightening torque to the locking bolt to achieve a necessary clamping action because this has no detrimental effect on the sealing ring which is arranged behind the clamping ring and which is protected by the invariable position thereof from negative (compression or displacement) influences.

Furthermore, the disclosure includes a clamping ring which is suitable for use for a fluid-conducting connection between a tube having a uniform outer diameter and a connection component having a bore for receiving the tube and which has an inner thread on a portion of its depth. That clamping ring can be arranged around the tube together with a locking bolt which has an outer thread which can engage the inner thread. Furthermore, the clamping ring can be clamped with respect to the tube by the locking bolt being screwed to the connection component.

Further disclosed herein is a clamping ring having an outer or male thread on its outer cylindrical surface which engages the inner or female thread of the bore in the connection component. The clamping ring is configured to fix the position of a sealing ring which can be arranged in the bore and which is provided for sealing around the outer surface of a tube with respect to the connection component.

In this instance, the clamping ring has a projecting clamping lip which may be surrounded by an annular groove formed in the clamping ring. In relation to the state of the clamping ring in which it is screwed into the bore, the clamping lip projects away from the sealing ring seat. Furthermore, the clamping lip has an external chamfer formed around its outer surface at the free or distal end thereof. The clamping lip is provided in order to correspond to a cylindrical collar of the locking bolt. To this end, the collar may preferably be arranged at a tip of the locking bolt, which tip is provided for insertion into the bore, and may have an inner chamfer formed thereon.

In relation to the annular groove of the clamping ring, the groove may advantageously be constructed in order to allow an at least partial engagement for the collar of the locking bolt when the bolt is screwed into the connection component and tightened against the clamping ring. In this instance, the outer chamfer of the clamping lip can advantageously be provided in order to at least partially touch the inner chamfer of the cylindrical collar of the locking bolt in the screwed-in state of the locking bolt.

Additional advantageous details and effects of the invention are explained in greater detail below with reference to an embodiment which is schematically illustrated in the Figures, in which:

BRIEF DESCRIPTION OF THE DRAWINGS

FIG. 6 shows the combination from FIG. 5 with the locking bolt in a fully inserted position, tightened against the clamping ring.

DETAILED DESCRIPTION

Figure 1:
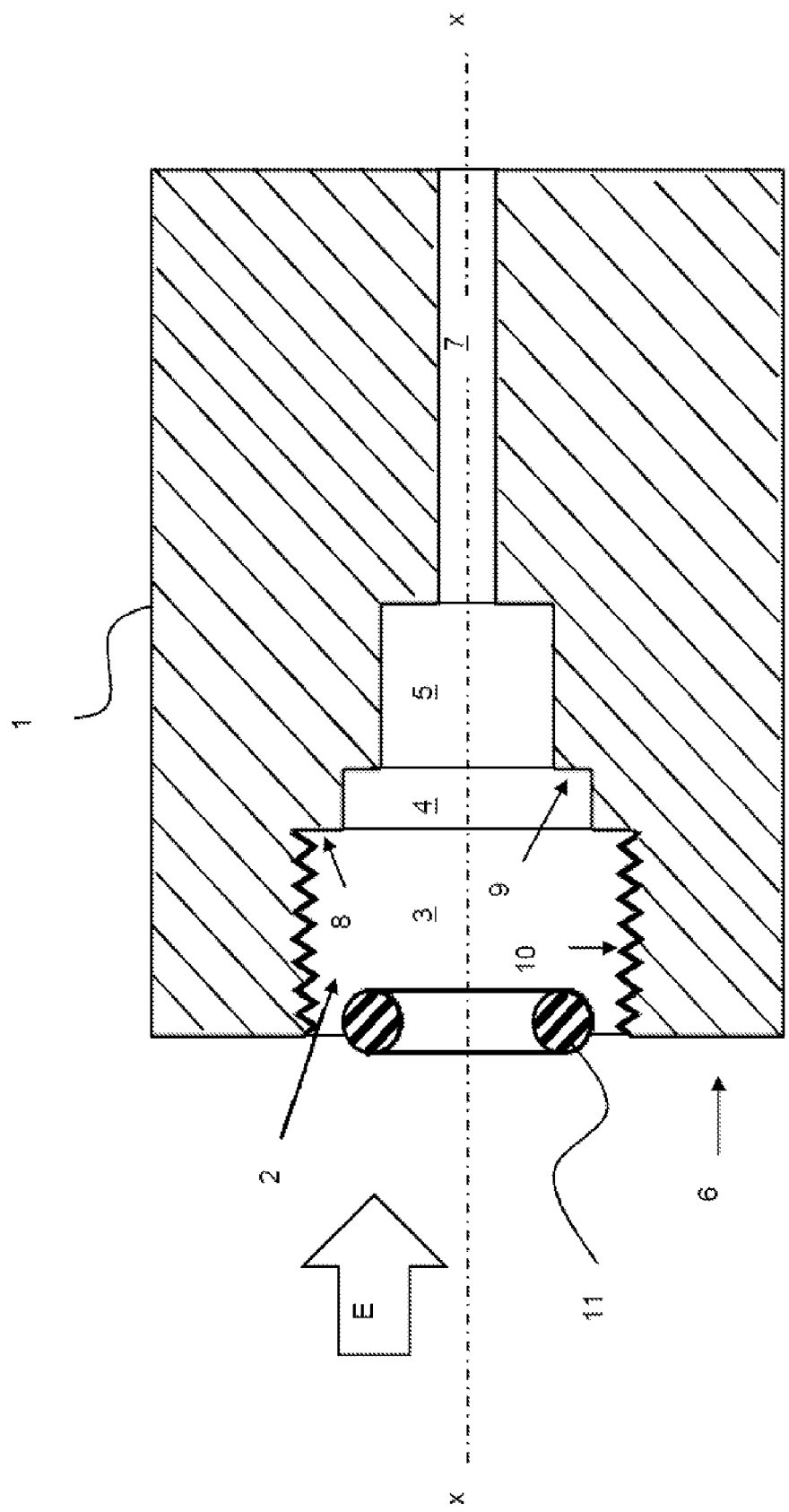
FIG. 1 is a cross-section along a longitudinal axis x of a connection component according to the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It should be noted that the features set out individually in the following description may be combined with each other in any technically advantageous manner and set out additional embodiments of the invention. The description further characterizes and specifies the invention with particular reference to the Figures.

In the different Figures, the same components are always indicated using the same reference numerals so that they are also generally described only once.

FIG. 1 is a schematic illustration of a connection component 1 illustrated as a cross-section so that a bore 2 extending through the connection component 1 in an axial direction x can be seen. The bore 2 may preferably have a circular cross-sectional shape. As may be seen, the bore 2 is divided into three individual segments 3, 4, 5 which have inner diameters which are different from each other. The first segment 3 of the bore 2 adjoins a front surface 6 of the connection component 1 and extends therefrom toward the second segment 4 which is located further inside the connection component 1. The third segment 5 adjoins the second segment 4 so that the second segment 4 is located between the first segment 3 and the third segment 5. The bore 2 finally opens into a line 7 which adjoins the third segment 5 and which has the smallest inner diameter with respect to the other segments 3, 4, 5 of the bore 2. The line 7 may preferably be of cylindrical form.

Beginning with the first segment 3 of the bore 2, as shown on the left in FIG. 1, an annular clamping ring seat 8 is located between the first segment 3 and the second segment 4 of the bore 2. Furthermore, an annular sealing ring seat 9 is formed between the second segment 4 and the third segment 5 of the bore 2.

Figure 2:
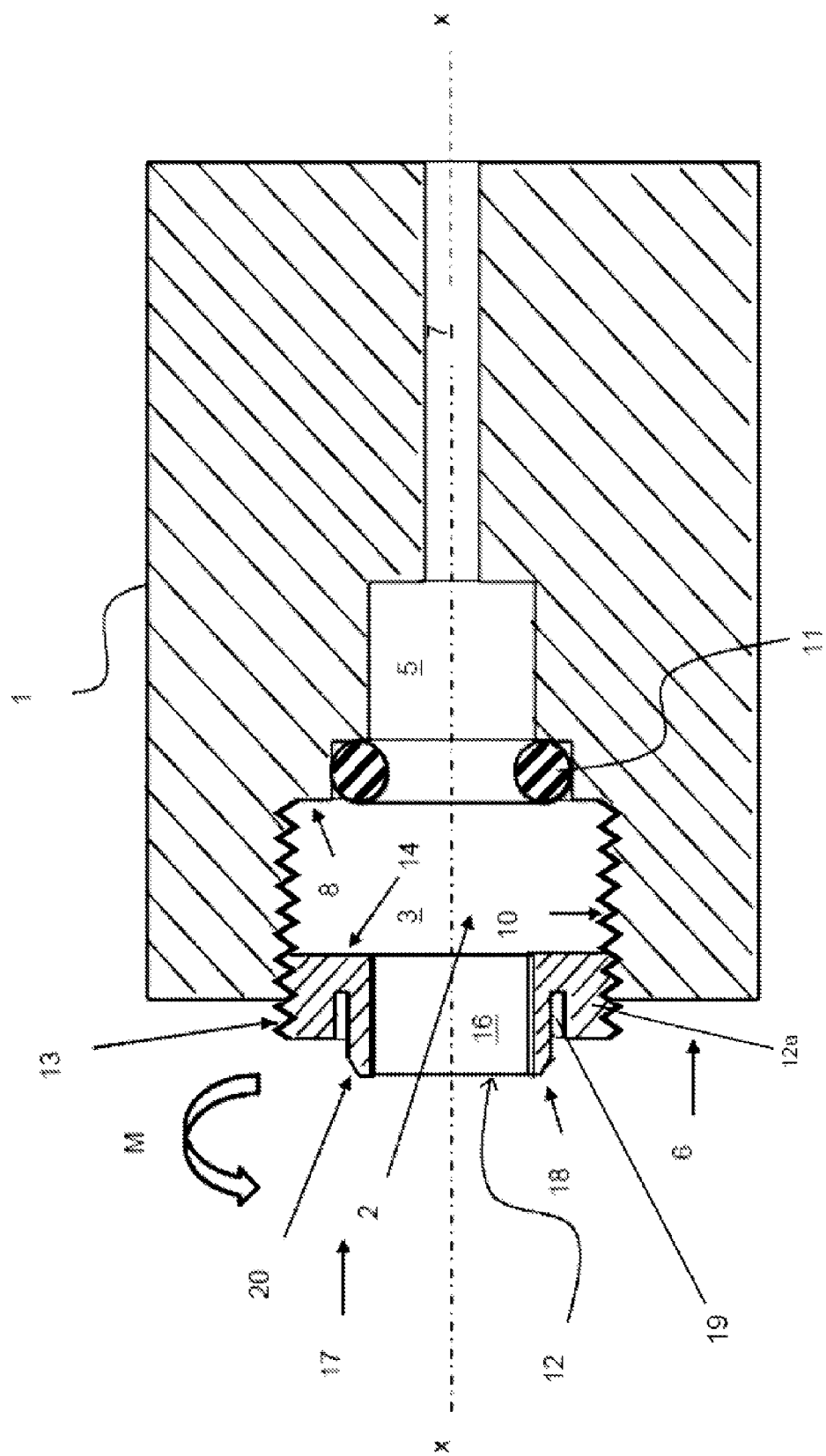
FIG. 2 shows the connection component from FIG. 1 in combination with a clamping ring according to the invention.

The first segment 3 is formed with an inner or female thread 10 which extends from the front surface 6 of the connection component 1 as far as the clamping ring seat 8. As indicated, a preferably resilient sealing ring 11 is insertable into the bore 2 from the front surface 6 of the connection component 1 in an insertion direction E through the first segment 3 as far as a location in the second segment 4. The end position of the sealing ring 11 is reached when the ring contacts the sealing ring seat 9 as can be seen in FIG. 2 which is described below.

After the sealing ring 11 reaches the end position against the sealing ring seat 9, a clamping ring 12 is inserted into the bore first segment. The outer diameter of the clamping ring 12 generally matches the inner diameter of the first segment, and the clamping ring 12 may have an outer or male thread 13 formed on the outer circumferential surface thereof and which fits into threaded engagement with the inner thread 10 of the bore first segment 3. In this case, the clamping ring 12 is screwed into the bore 2 by the application of a torque M which corresponds to the screwing direction of the mutually corresponding threads 10, 13. FIG. 2 shows the clamping ring 12 as it is starting to be screwed into the bore first segment 3.

Figure 3:
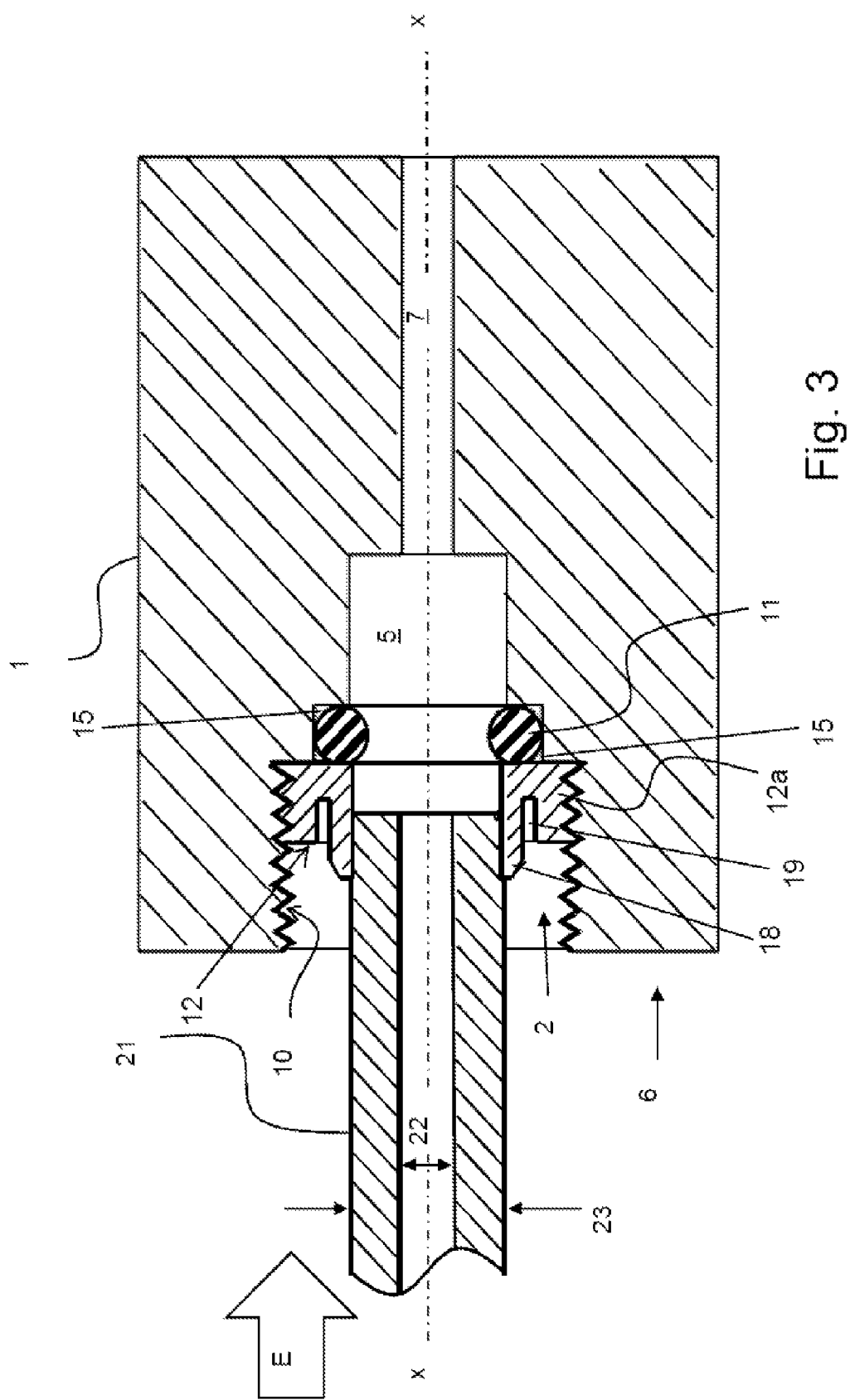
FIG. 3 shows the combination from FIG. 2 together with a tube which is intended to be joined to the connection component.

The operating position of the clamping ring 12 is reached when the ring reaches the end of the first segment 3 so that an annular support face 14 of the clamping ring 12 contacts the clamping ring seat 8, as shown in FIG. 3. In this manner, abutment of the annular support face 14 against the clamping ring seat 8 forms an annularly extending groove 15 between the annular support face 14 and the sealing ring seat 9. As best seen in FIG. 3, the groove receives the sealing ring 11. In this manner, the clamping ring 12 when screwed into the bore 2 cooperates with the sealing ring seat 9 to fix the sealing ring 11 in the longitudinal direction x of the bore 2 inside the connection component 1.

As shown in the present Figures, the clamping ring 12 comprises a base 12a defining a central through-opening 16. The clamping ring 12 has a clamping lip 18 projecting from an end surface 17 of the base 12a in a direction away from the annular support face 14 and consequently also away from the sealing ring 11 and the sealing ring seat 9. The clamping lip 18 may preferably be formed integrally with the base 12a of the clamping ring 12. Furthermore, an annular groove 19 is formed in the clamping ring base 12a, the groove extending into the base from the end surface 17 and surrounding the clamping lip 18.

The clamping lip 18 has an angled annular surface 20 around the outer surface at the free or distal end thereof. In other words, an external chamfer is formed around the outer periphery thereof at the free or distal end of the clamping lip 18 so that the clamping lip 18 tapers from the outer periphery toward the free end thereof.

FIG. 3 illustrates the position of the clamping ring 12 when it is screwed completely into the connection component 1 within the first segment 3 of the bore 2. It is further possible to see a smooth tube 21, only the end section of which is illustrated. As may be seen, the tube 21 has an inner diameter 22 which at least substantially corresponds to the inner diameter of the line 7 inside the connection component 1. Furthermore, the tube has a uniform outer diameter 23 which is sized such that the tube 21 can be inserted in the insertion direction E through the through-opening 16 of the clamping ring 12 and through the sealing ring 11 at least partially into the bore 2. Furthermore, the third bore segment 5 is also adapted to the outer diameter 23 of the tube 21 in such a manner that the tube can be introduced into the third segment 5 with only a small amount of clearance.

Figure 4:
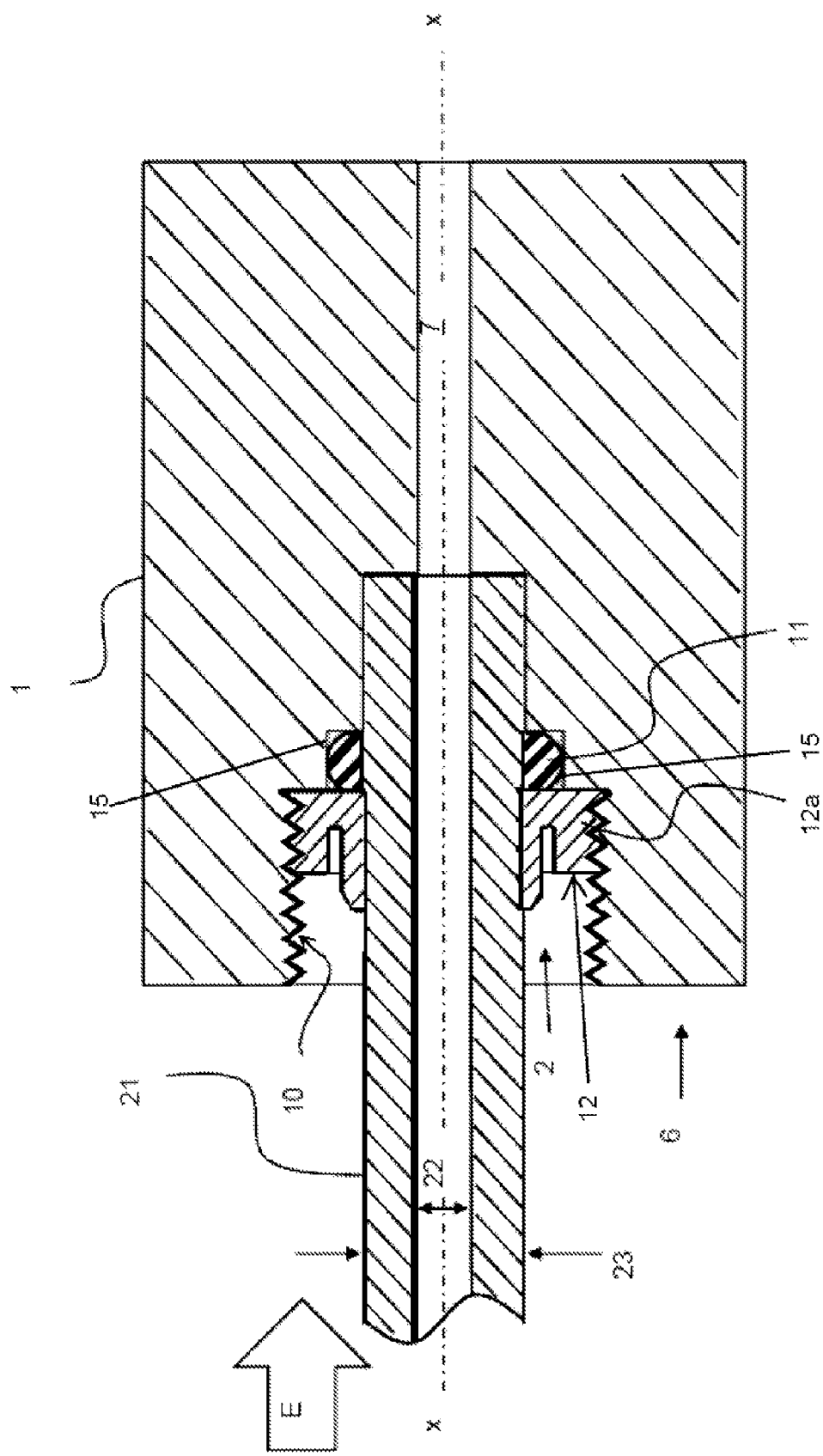
FIG. 4 shows the combination from FIG. 3 in the fully inserted position of the tube.
Figure 5:
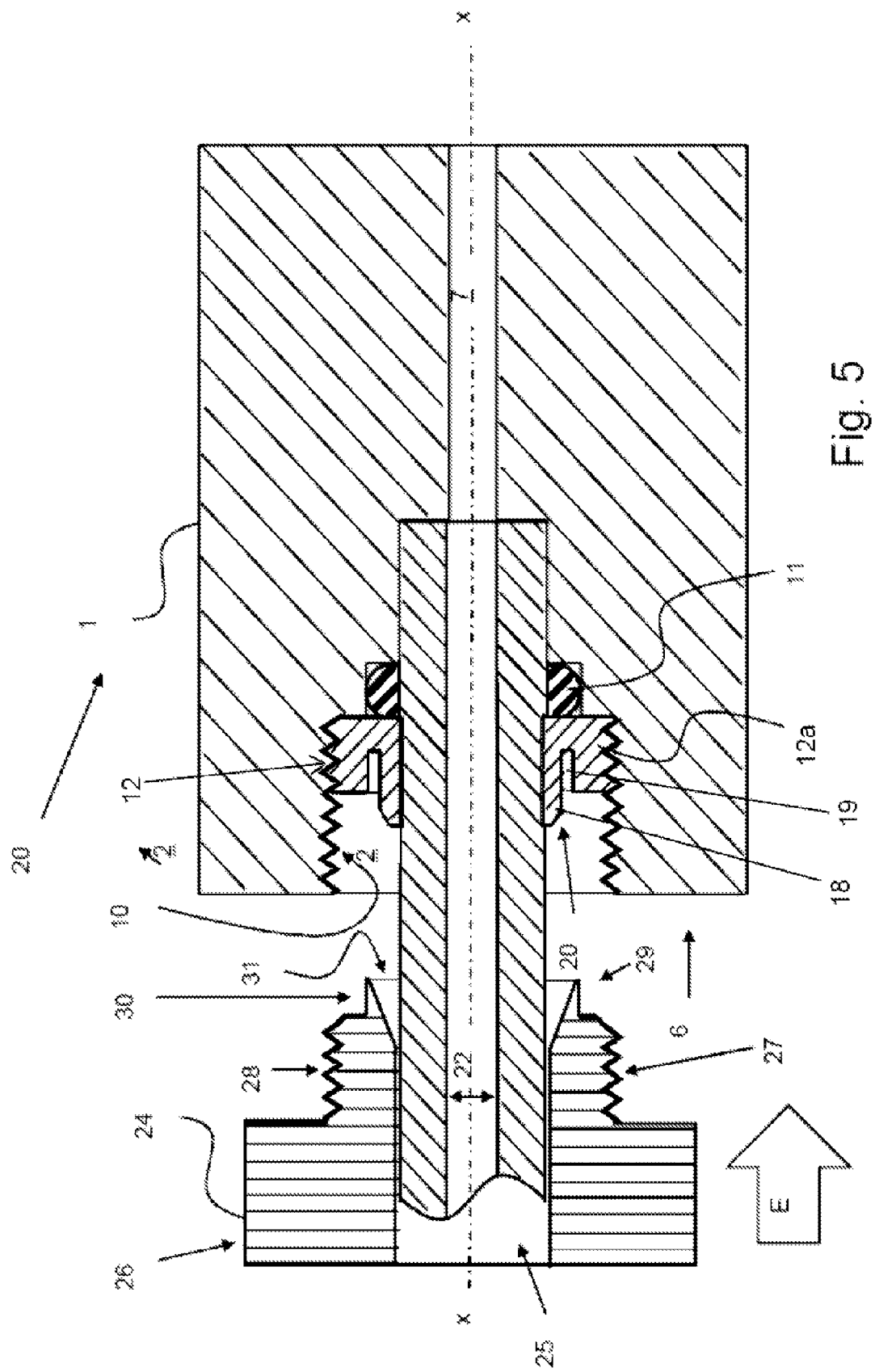
FIG. 5 shows the combination from FIG. 4 together with a locking bolt.

FIG. 4 shows the tube 21 inserted fully into the connection component 1. To this end, the tube 21 is pushed forward into the bore 2 in the insertion direction E until the end thereof contacts the end of the third segment 5. In other words, the annular seat at the junction between bore third segment 5 and the line 7 forms a seat for the tube 21. As may be seen, the tube 21 is surrounded circumferentially both by the sealing ring 11 and by the clamping ring 12. Thus, the sealing ring 11 provides a fluid seal between the outer surface of the tube 21 and the inner surface of the bore 2. As seen in FIGS. 4-6, the resilient sealing ring 11 is displaced radially outward and consequently adapted to the outer diameter 23 of the tube 21.

FIG. 5 shows a locking bolt 24 which also has a through-opening 25 for receiving the tube 21 when the locking bolt 24 is fitted over the tube. In a preferred assembly process, the locking bolt 24 is already arranged around the tube 21 before the tube 21 is inserted into the bore 2, which is not, however, illustrated in greater detail in the preceding FIGS. 1 to 4.

The locking bolt 24 has a head 26 and a shaft 27, with the shaft 27 being provided for at least partial insertion into the bore 2 of the connection component 1. To this end, the outer diameter of the shaft 27 is adapted to the inner diameter of the first segment 3 of the bore 2. Furthermore, the locking bolt 24 has an outer or male thread 28 formed on the shaft 27 thereof and which corresponds to the inner thread 10 of the bore first segment 3. The outer circumferential surface of the head 26 may be adapted (not illustrated in greater detail) to receive a tool (not shown) for tightening and/or loosening the locking bolt 24. For example, the head 26 may take the form of a hexagon-head bolt.

The locking bolt 24 has an annular collar 30 projecting from the shaft 27 and which is adapted for insertion into the bore 2 of the connection component 1. The collar 30 projects with respect to the remaining tip 29 in such a manner that it corresponds to the clamping lip 18 of the clamping ring 12 in the screwed-in state of the locking bolt 24. To this end, the cylindrical collar 30 of the locking bolt 24 has a conical expansion or inner chamfer 31 disposed at the inner or insertion end of the through-opening 25.

With regard to the clamping ring 12 which is already positioned inside the connection component 1, the outer chamfer 20 of the clamping lip 18 and the inner chamfer 31 of the collar 30 of the locking bolt 24 are provided in order to touch each other at least partially when the locking bolt 24 is screwed into the connection component 1, as shown in FIG. 6. As a result of the angled surfaces of the inner chamfer 31 and the outer chamfer 20, which surfaces may be inclined generally parallel with each other, they can slide further toward each other with increasing depth 2 (in the insertion direction E) of the locking bolt 24 into the bore. The clamping lip 18 is at least resiliently flexible and thus is pressed radially inward onto the outer circumferential surface of the tube 21. In this manner, the clamping ring 12 can be clamped with respect to the tube 21 by screwing the locking bolt 24 into the connection component 1.

FIG. 6 illustrates the screwed-in state of the locking bolt 24 in the connection component 1, in which the outer thread 28 of the locking bolt 24 and the inner thread 10 of the bore 2 are at least partially engaged with each other. Application of an appropriate torque M to the locking bolt 24 produces an inwardly-directed clamping action via the clamping ring 12 on the tube 21 so that the tube is securely retained within the connection component 1. The sealing ring 11 substantially takes over the sealing function with respect to fluids conducted by the tube 21 and the connection component 1. The collar 30 projects at least partially into the annular groove 19 of the clamping ring 12 so that it is possible to bring the locking bolt 24 and clamping ring 12 close together in order to apply the necessary clamping action.

As a result, a connection 32 disclosed herein for the fluid-conducting connection between the smooth tube 21 and the connection component 1 is now established.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
   a component defining a bore extending from a surface of the component along an axis, the bore comprising a first segment of a first diameter adjoining the surface and threaded on at least a portion thereof, and a second segment adjoining the first segment and of a second diameter smaller than the first diameter to define a ring seat between the first and second segments;
   a ring positioned on the seat and having an annular lip projecting axially away from the seat, wherein the ring has an annular groove surrounding the lip; and
   a bolt threadingly engaged with the first segment, and having a through-hole for receiving a tube and an annular collar projecting axially toward the seat and surrounding the lip to urge the lip radially inward when the bolt is tightened against the ring.

2. The apparatus of claim 1, wherein a distal end of the lip has an external chamfer contacting the collar when the bolt is tightened against the ring.

3. The apparatus of claim 1, wherein the ring is threadingly engaged with the first segment.

4. The apparatus of claim 1, wherein a distal end of the collar has an internal chamfer contacting the lip when the bolt is tightened against the ring.

5. The apparatus of claim 1, wherein the seat is defined between a first segment of the bore having a first diameter and a second segment of the bore adjoining the first segment and having a second diameter smaller than the first diameter, and a sealing ring seat is defined between the second segment and a third segment of the bore adjoining the second segment and having a third diameter smaller than the second diameter, and the apparatus further comprises a sealing ring positioned between the sealing ring seat and a portion of the ring extending radially inward beyond the seat, the sealing ring receiving the tube.

6. Apparatus comprising:
a component defining a bore comprising a first segment, a second segment, and a third segment having respective diameters of sequentially smaller diameter, the first segment adjoining a surface of the component;
a ring seated on a seat defined between the first and second segments and receiving a tube, and having an annular lip extending away from the seat;
a bolt threadingly engaged with the first segment and contacting the ring, having a through-hole receiving the tube and an annular collar surrounding the lip and urging the lip radially inward against the tube when the bolt is tightened against the ring; and
a sealing ring positioned between a portion of the ring extending radially inward beyond the seat and a sealing ring seat defined between the second and third segments, the sealing ring receiving the tube.

7. The apparatus of claim 6, wherein a distal end of the lip has an external chamfer contacting the collar when the bolt is tightened against the ring.

8. The apparatus of claim 6, wherein the ring is threadingly engaged with the first segment.

9. The apparatus of claim 6, wherein a distal end of the collar has an internal chamfer contacting the lip when the bolt is tightened against the ring.

10. The apparatus of claim 6, wherein the ring has an annular groove surrounding the lip.

11. Apparatus comprising:
a component defining a bore having a seat;
a ring threadingly engaging the bore, seated on the seat, receiving a tube, and having an annular lip projecting away from the seat; and
a bolt threadingly engaged with the bore and contacting the ring, having a through-hole receiving the tube and an annular collar surrounding the lip and urging the lip radially inward against the tube when the bolt is tightened against the ring.

12. The apparatus of claim 11, wherein a distal end of the collar has an internal chamfer contacting the lip when the bolt is tightened against the ring.

13. The apparatus of claim 11, wherein a distal end of the lip has an external chamfer contacting the collar when the bolt is tightened against the ring.

14. The apparatus of claim 11, wherein the ring has an annular groove surrounding the lip.

15. The apparatus of claim 11, wherein the seat is defined between a first segment of the bore having a first diameter and a second segment of the bore adjoining the first segment and having a second diameter smaller than the first diameter, and a sealing ring seat is defined between the second segment and a third segment of the bore adjoining the second segment and having a third diameter smaller than the second diameter, and the apparatus further comprises a sealing ring positioned between the sealing ring seat and a portion of the ring extending radially inward beyond the seat, the sealing ring receiving the tube.

* * * * *